Jan. 20, 1925.
J. C. ROUGEOT
BUMPER
Filed March 18, 1924
1,523,978
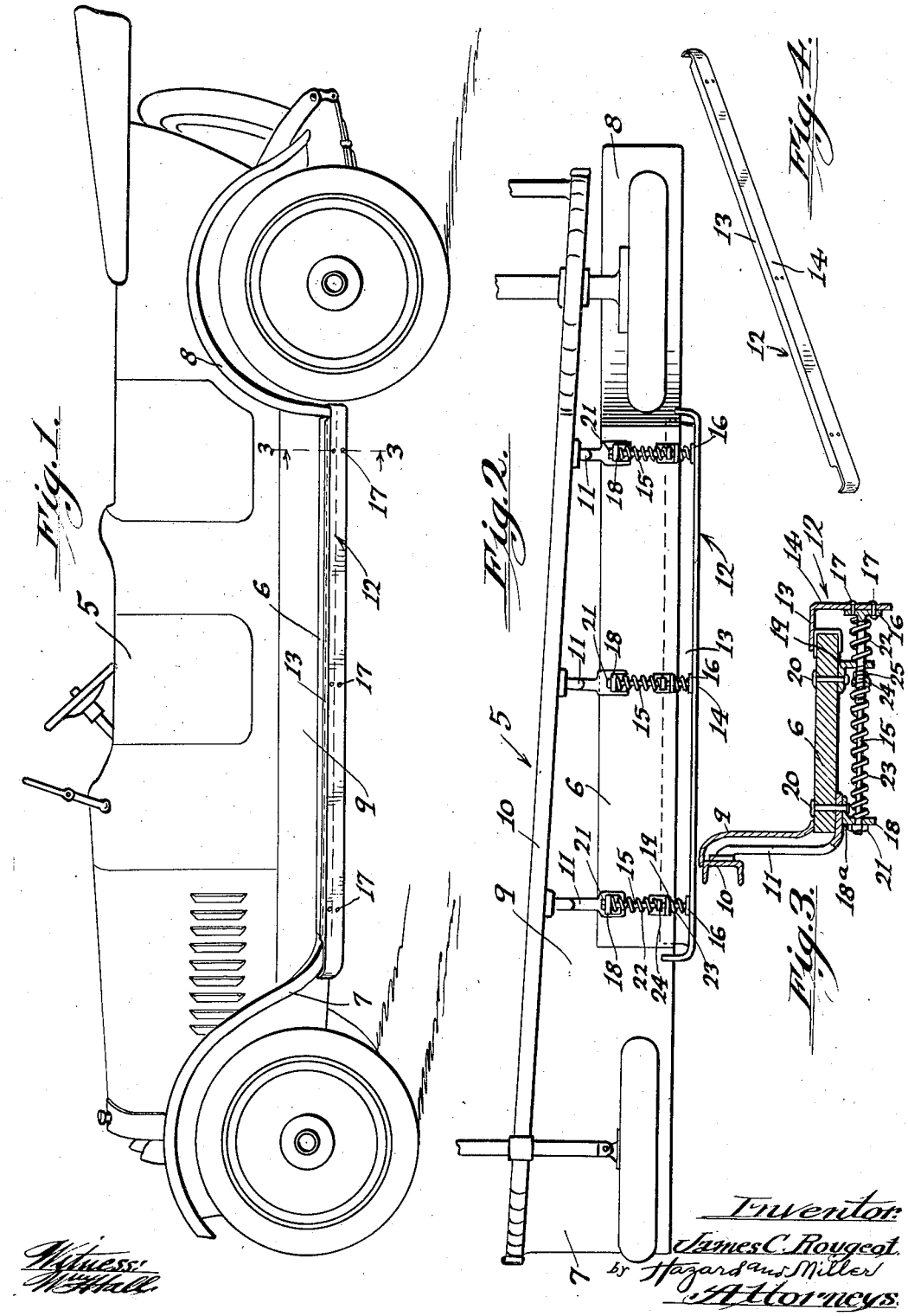

Patented Jan. 20, 1925.

1,523,978

UNITED STATES PATENT OFFICE.

JAMES C. ROUGEOT, OF LONG BEACH, CALIFORNIA.

BUMPER.

Application filed March 18, 1924. Serial No. 700,037.

*To all whom it may concern:*

Be it known that I, JAMES C. ROUGEOT, a citizen of the United States, residing at Long Beach, in the county of Los Angeles and State of California, have invented new and useful Improvements in Bumpers, of which the following is a specification.

This invention relates to bumpers, and more particularly to bumpers associated with the running boards of automobiles.

An object of this invention is the provision of a bumper adapted to protect a running board of an automobile.

Another object of this invention is the provision of a bumper comprising a member adapted to fit the forward and rear fenders of an automobile.

A further object of this invention is the provision, in an automobile, of a bumper, the tension of which may be adjusted.

With the foregoing objects in view, together with such other objects and advantages as may subsequently appear, this invention resides in the construction and arrangement of parts hereinafter described and claimed and illustrated in the accompanying drawings, in which:

Figure 1 is a side perspective view of an automobile having a running board, with which is associated the bumper of this invention, Fig. 2 is a bottom plan view of Fig. 1, Fig. 3 is a section taken on the line 3—3 of Fig. 1, and Fig. 4 is a perspective view of a member L-shaped in cross section forming part of the bumper and which guards the running board.

Referring to the drawings for a more detailed description thereof, the numeral 5 indicates an automobile having the usual running board 6, a forward fender 7 and a rear fender 8. The usual sheeting 9 extends forwardly from the inner edge of the running board. The running board 6 is supported from a frame member 10 by depending members 11. An L-shaped member 12, having a horizontal side 13 and a vertical side 14, has the side 13 cut away at its ends and the end portions of the side 14 turned inwardly under the front and rear fenders 7 and 8 respectively. The horizontal side 13 of the L-shaped member 12 extends over the outer edge of the running board 6, the vertical side 14 being spaced from the outer edge of the running board.

Rods 15 having flanges 16 are secured to the side 14 of the L-shaped member 12 by bolts 17 which pass through the flanges 16. The rods 15 are at right angles to the side 14 of the member 12 and extend under the running board and parallel therewith. Each rod 15 passes through angle irons 18 and 19 which are respectively secured by bolts 20 and 21 which pass through the running board. The rods 15 are adapted to slide in the apertures of the angle irons 18 and 19 through which they pass. A nut 21 is threaded on an end of each of the rods 15 and abuts against a face $18^a$ of the angle iron 18.

Coiled compression springs 22 encircle a portion of each of the rods 15 and each is held between an angle iron 19 and a flange 16, and is adapted to resist the inward movement of the L-shaped member 12. Coiled compression springs 23 also encircle a portion of each of the rods 15 and are each held between an angle iron 18 and a nut 24 which threadedly engages each of the rods 15. A lock nut 25 is provided on each of the rods 15 to hold the nut 24 in place.

It will thus be seen that I have provided, in combination, a bumper and a running board of an automobile, the bumper comprising a member extending along the running board and spaced outwardly from the outer edge thereof, together with resilient means associated with the said member to resist its movement towards the edge of the running board.

While I have herein described one form of my invention, modifications thereof may be devised without departing from the spirit thereof, and it is to be understood that such modifications come within the scope of this invention.

What is claimed is:

1. In combination, a bumper and a running board of an automobile, said bumper having a portion slidably resting upon the upper surface of said running board.

2. In combination, a bumper and a running board of an automobile, said bumper comprising a member extending along the running board, said member being resiliently secured to the frame of said automobile.

3. In combination, a bumper and a running board of an automobile, said bumper comprising a member extending along the running board and spaced outwardly from the outer edge thereof, and resilient means associated with said member to resist its movement toward the edge of the running board.

4. In combination, a bumper and a running board of an automobile, said bumper comprising a member extending along the running board and spaced outwardly from the outer edge thereof, said member being turned in under the front and rear fenders, and springs associated with said member to resist its movement toward the edge of the running board.

5. In combination, a bumper and a running board of an automobile, said bumper comprising a member extending along the running board and spaced outwardly from the outer edge thereof, a second member secured to the first mentioned member and extending under the running board, means attached to the running board and slidably supporting the second mentioned member, and a compression spring encircling the second mentioned member, said spring being adapted to resist movement of the first mentioned member towards the outer edge of the running board.

6. In combination, a bumper and a running board of an automobile, said bumper comprising an L-shaped member extending along the running board, the vertical portion of said L-shaped member being spaced outwardly from the outer edge of the running board and the horizontal edge of said L-shaped member being partly in contact with the outer edge of said running board, a rod secured to the vertical portion of said L-shaped member and extending under the running board, means for slidably supporting said rod from the running board and a compression spring encircling said rod, said compression spring being adapted to resist movement of the vertical portion of said L-shaped member towards the outer edge of the running board.

7. In combination, a bumper and a running board of an automobile, said bumper comprising an L-shaped member extending along the running board, the vertical portion of said L-shaped member being spaced outwardly from the outer edge of the running board and the horizontal edge of said L-shaped member being partly in contact with the outer edge of said running board, a rod secured to the vertical portion of said L-shaped member and extending under the running board, means for slidably supporting said rod from the running board and a compression spring encircling said rod, said compression spring being adapted to resist movement of the vertical portion of said L-shaped member towards the outer edge of the running board, said L-shaped member having its horizontal portion cut away at both ends of the member, the vertical end portions being turned under the front and rear fenders respectively.

8. In combination, a bumper and a running board of an automobile, said bumper comprising an L-shaped member extending along the running board, the vertical portion of said L-shaped member being spaced outwardly from the outer edge of the running board, and the horizontal edge of said L-shaped member being partly in contact with the outer edge of said running board, a threaded rod secured to the vertical portion of said L-shaped member, and extending under the running board, means for slidably supporting said rod from the running board, and a plurality of compression springs encircling said rod and adapted to act independently, and means for adjusting the tension of at least one of the springs, said springs being adapted to resist the movement of the vertical portion of the L-shaped member towards the outer edge of the running board.

In testimony whereof I have signed my name to this specification.

JAMES C. ROUGEOT.